United States Patent
Zhang et al.

(10) Patent No.: US 10,360,248 B1
(45) Date of Patent: Jul. 23, 2019

(54) METHOD AND SYSTEM FOR PROCESSING SEARCH QUERIES USING PERMISSION DEFINITION TOKENS

(71) Applicant: EMC Corporation, Hopkinton, MA (US)

(72) Inventors: Lei Zhang, Shanghai (CN); Chao Chen, Shanghai (CN); Jingjing Liu, Shanghai (CN); Kunwu Huang, Shanghai (CN); Hongtao Dai, Shanghai (CN); Ying Teng, Pleasanton, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 479 days.

(21) Appl. No.: 15/198,897

(22) Filed: Jun. 30, 2016

(51) Int. Cl.
```
G06F 16/33     (2019.01)
G06F 16/31     (2019.01)
G06F 21/62     (2013.01)
H04L 29/06     (2006.01)
```

(52) U.S. Cl.
CPC ......... *G06F 16/3332* (2019.01); *G06F 16/31* (2019.01); *G06F 21/6209* (2013.01); *H04L 63/083* (2013.01)

(58) Field of Classification Search
CPC .......... G06F 17/3066; G06F 17/30613; G06F 21/6209; G06F 16/3332; G06F 16/31; H04L 63/083
See application file for complete search history.

(56) References Cited

U.S. PATENT DOCUMENTS

| | | | |
|---|---|---|---|
| 7,284,045 B1* | 10/2007 | Marl | G06Q 10/107 709/203 |
| 9,641,555 B1* | 5/2017 | Brisebois | G06F 21/60 |
| 2005/0131905 A1* | 6/2005 | Margolus | G06F 21/6272 |
| 2007/0208744 A1* | 9/2007 | Krishnaprasad | G06F 21/6227 |
| 2012/0290629 A1* | 11/2012 | Beaverson | H04L 67/1087 707/827 |
| 2017/0118224 A1* | 4/2017 | Balasubramanian | H04L 63/20 |
| 2017/0344749 A1* | 11/2017 | Yang | G06F 21/6209 |

* cited by examiner

*Primary Examiner* — James Trujillo
*Assistant Examiner* — Hubert Cheung
(74) *Attorney, Agent, or Firm* — Chamberlain, Hrdlicka, White, Williams, & Aughtry

(57) ABSTRACT

In general, in one aspect, the invention relates to a method for servicing requests, the method includes receiving, from a client system, a first request comprising a query, determining a first user associated with the first request, modifying the query to obtain a first modified query, where the first modified query includes a first permission definition token associated with the first user, processing the modified query to obtain a first object from a content repository, and providing the first object to the client system.

14 Claims, 8 Drawing Sheets

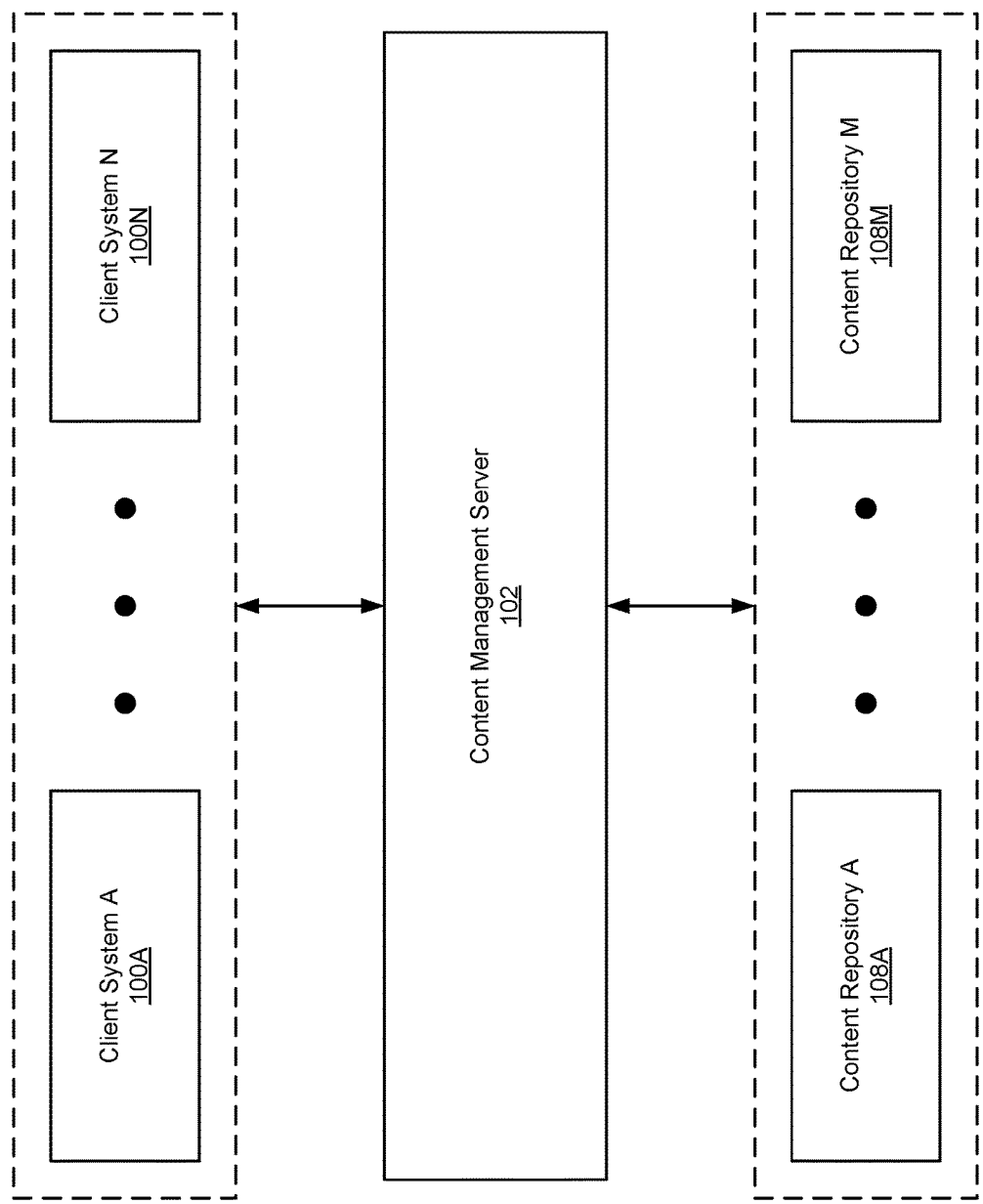

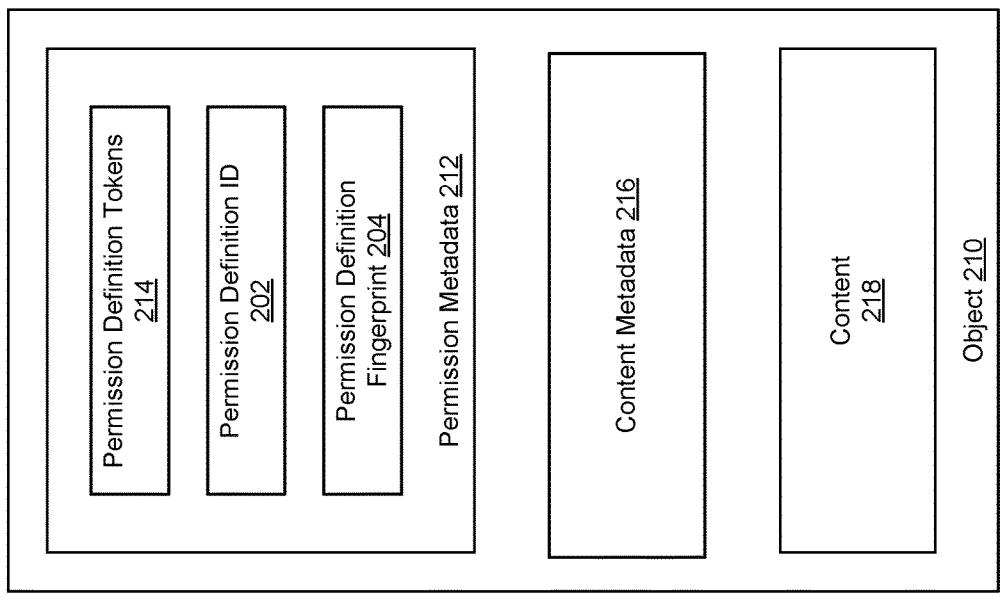

US 10,360,248 B1

METHOD AND SYSTEM FOR PROCESSING SEARCH QUERIES USING PERMISSION DEFINITION TOKENS

BACKGROUND

A significant amount of content is stored in content repositories. The access and manipulation of this content is typically restricted using various types of access control mechanisms. In conventional systems, accessing content in a content repository is a two-stage process. In the first stage, all content matching a query issued by a user is obtained. In a second phase, access control mechanisms are applied to the retrieved content in order to identify only the content that the user is permitted to access. This limited set of content is then provided to the user. This two-stage process introduces a significant amount of latency in the retrieval of content from the content repositories.

BRIEF DESCRIPTION OF DRAWINGS

FIG. 1 shows an exemplary system in accordance with one or more embodiments of the technology.

FIG. 2D shows an exemplary object in accordance with one or more embodiments of the technology.

DETAILED DESCRIPTION

Figure 2A:
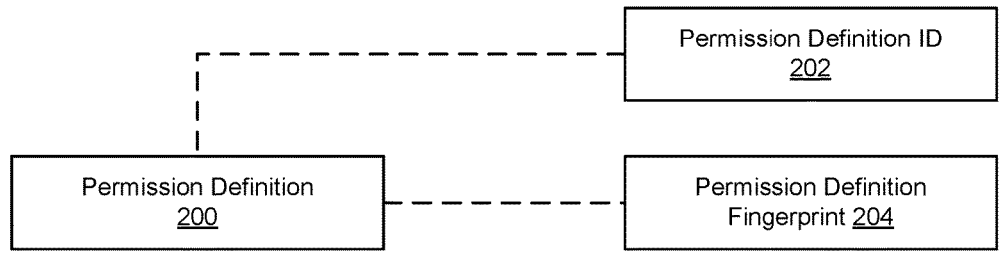
FIGS. 2A-2C show various relationships between components in accordance with one or more embodiments of the technology.

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

In the following description of FIGS. 1-7, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment, which may be implemented in addition to, in conjunction with, or in place of the embodiments described with regard to a corresponding like-named component in any other figure.

In general, embodiments of the technology relate to a method and system for using permission definition tokens to service queries to content repositories. More specifically, embodiments of the technology relate to improving performance (and/or decreasing the latency) in servicing queries to content repositories by modifying the queries to include permission definition tokens. In this manner, only objects with the appropriate permission definition tokens are obtained from the content repository. Said another way, only the objects that the user is permitted to access are obtained from the content repository in a single stage instead of first returning all objects that satisfy the query (regardless of whether the user is actually permitted to read and/or write to these objects) and then applying the access control mechanisms to the set of obtained objects.

FIG. 1 shows an exemplary system in accordance with one or more embodiments of the technology. The system includes one or more client systems (100A, 100N), a content management service (102), and one or more content repositories (108A, 108M). The aforementioned components may communicate with each other using any known or later discovered communication protocol. Further, the aforementioned components may communicate using any combination of wired and/or wireless connections and wired and/or wireless networks. Each of the aforementioned components is described below.

In one embodiment of the technology, a client system corresponds to any computing system (see e.g., FIG. 7) that includes functionality to issue requests (also referred to as queries) to the content management service (102) and to receive a corresponding response(s) from the content management service after the request has been serviced.

Continuing with the discussion of FIG. 1, the content management service includes functionality to perform all or a portion of the methods shown in FIGS. 3A-6. The content management service may also include functionality to perform various actions (e.g., read, write, delete, modify, send, etc.) on the objects stored in the content repositories when servicing requests from the client systems (see e.g., FIGS. 3A-6).

Figure 6:
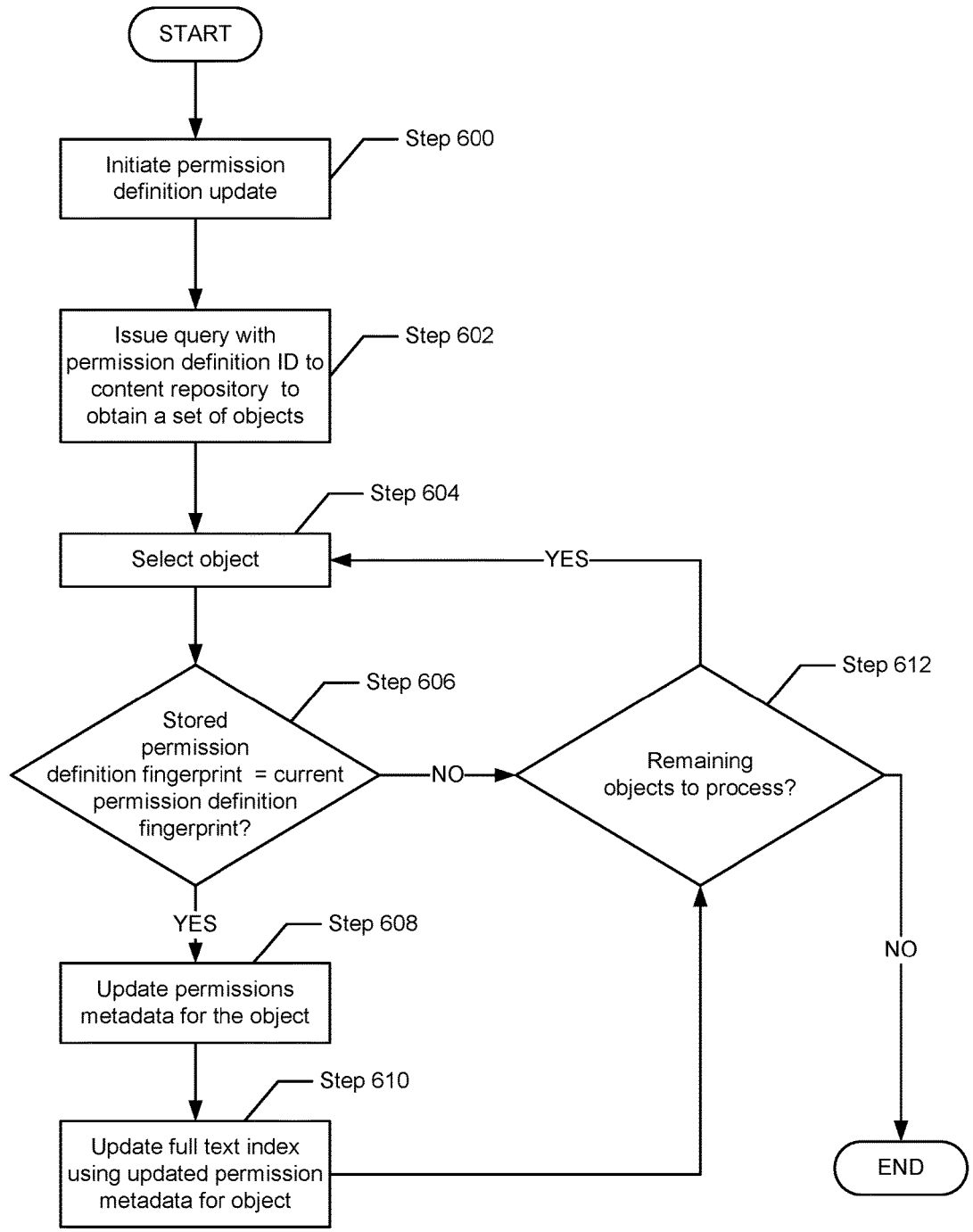
FIG. 6 shows a method for updating permission metadata for objects in accordance with one or more embodiments of the technology.
Figure 7:
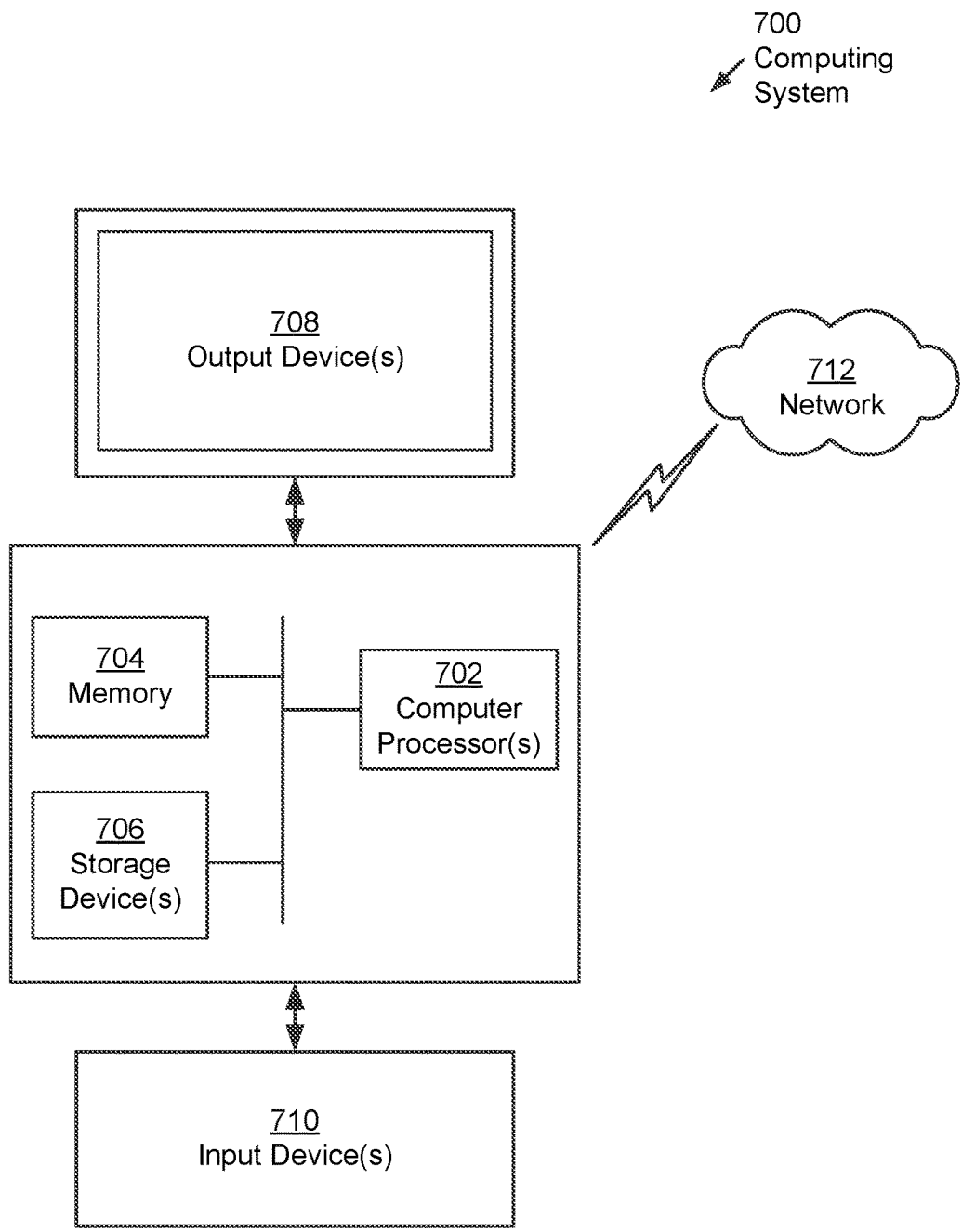
FIG. 7 shows a computing system in accordance with one or more embodiments of the technology.

The content management service may be implemented using one or more computing systems (see e.g., FIG. 7). Additional detail about the operation of the content management service is provided in FIGS. 3A-6.

In one embodiment of the technology, each content repository (108A, 108M) includes persistent storage (e.g., solid state storage, magnetic storage, optical storage, any other type of persistent storage or any combination thereof) in which objects (see e.g., FIG. 2D), permission records (which include permission definitions (see e.g., FIG. 2A), permission definition tokens (see e.g., FIG. 2B), permission definition fingerprints (see e.g., FIG. 2A), permission definition IDs (see e.g., FIG. 2A)) and a hash map(s) (which includes permission definition tokens associated with a user) (see e.g., FIG. 2C and FIG. 3B) are stored.

Continuing with the discussion of the content repositories, each of the content repositories may store objects, permission records, and/or hash maps using any known or subsequently discovered mechanism. The following describes various examples of the mechanisms that may be used to store objects, permission records, and hash maps. The examples are not intended to limit the technology. In a first example, the content repository (108A, 108M) may be a set of magnetic hard disks. In a second example, the content repository (108A, 108M) may be implemented using a computer cluster that is executing a distributed file system. In a third example, the content repository (108A, 108M) may be implemented using a network file server and one or more block-storage devices (i.e., as a Storage Area Network).

The technology is not limited to the architecture of the system shown in FIG. 1.

Figure 2B:
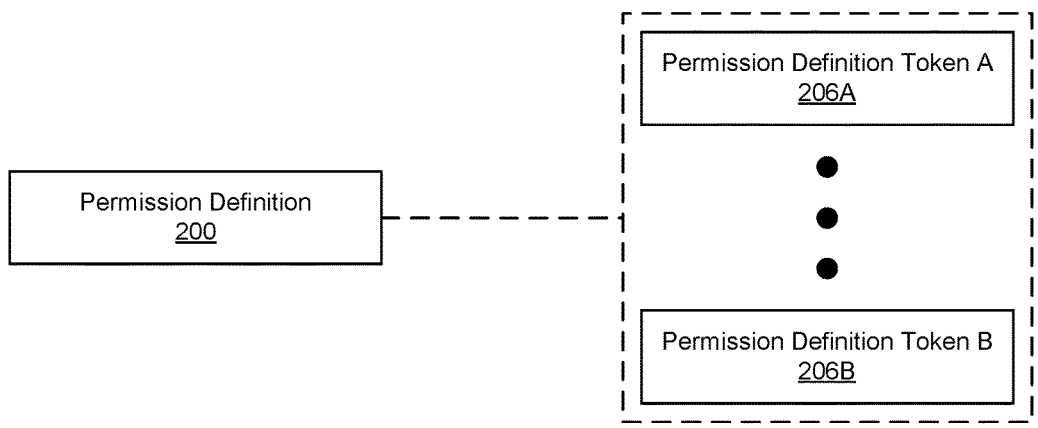
Figure 2C:
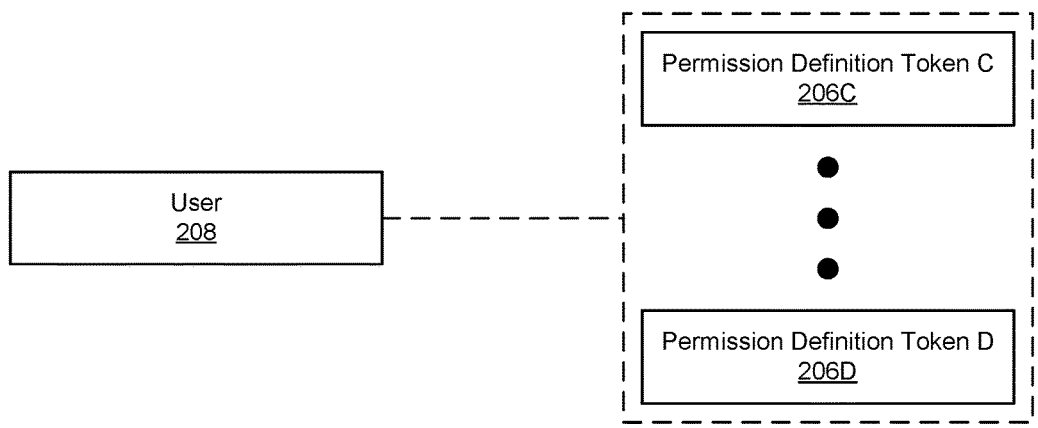

FIGS. 2A-2C show various relationships between components in accordance with one or more embodiments of the technology. Turning to FIG. 2A, in one embodiment of the technology, the content management system enables users to generate permission definitions (200). Each permission definition may specify one or more users, one or more groups of users, and permissions for each of the specified users and/or groups of users. The following are non-limiting examples of permission definitions.

Example 1—Permission Definition 1: [Group A: read, Group B: Read, Group C: read and write]

Example 2—Permission Definition 2: [any user can read and write]

Example 3—Permission Definition 3: [User: Bob can read]

Continuing with the discussion of FIG. 2A, each of the permission definitions is associated with a permission definition ID (202), which uniquely identifies the permission definition. The permission definition ID (202) may correspond to any combination of letters, numbers, and/or symbols. The permission definition (200) is also associated with a permission definition fingerprint (204). The permission definition fingerprint, in one embodiment of the technology, may be generated applying a hash function (e.g., SHA-1, MD5, etc.) to the set of permission definition tokens (see e.g., FIG. 2B) that are currently associated with the permission definition. As discussed in FIG. 6, the permission definition and permission definition fingerprint may be periodically updated.

Referring to FIG. 2B, as discussed above, each permission definition (200) may be associated with one or more permission token definitions (206A, 206B). In one embodiment of the technology, the permission definition (200) is parsed on a per-user or per-group basis (as appropriate) to generate a set of sub-permission definitions. Each of these sub-permission definitions is then used to generate a permission token definition (206A, 206B). In one embodiment of the technology, the permission token definition is a string that includes a text portion and a numeric portion. In other embodiments of the technology, the permission token definition may include any combination of letters, numbers, and/or symbols.

The following is a non-limiting example of permission definition tokens associated with a permission definition. Turning to the example, consider Permission Definition 4: [Group A: read, Group B: Read, User Bob: read and write]. When Permission Definition 4 is parsed the following three sub-permission definitions are identified: (i) Group A: read, (ii) Group B: Read; (iii) User Bob: read and write. Accordingly, the following three permission definition tokens are generated (each corresponding to one of the aforementioned sub-permission definitions): (i) GRP1200000180000100, (ii) GRP1200000180000103, and (iii) USR1100000180000102. As discussed above, each permission definition is associated with a permission definition fingerprint that is generating using the permission definition tokens associated with the permission definition. Continuing the above example, the permission definition fingerprint for Permission Definition 4 is MD5 (GRP1200000180000100, GRP1200000180000103, USR1100000180000102), which results in a permission definition fingerprint of 17A73246DD1FF9E3AAD43DB9BF9089DF.

Referring to FIG. 2C, in one embodiment of the technology, each user is associated with one or more permission definition tokens (206C, 206D). The permission token definitions associated with a user (208) may be associated with different permission definitions (200). The permission definition tokens (206C, 206D) that are associated with a given user (208) may be stored in a hash map maintained by the content management service (102). In such embodiments, the hash map includes one entry for each user, where the entry for the user includes: (i) a hash value generated by applying a hash function (e.g., MD5, SHA-1) to a user ID and (ii) the list of permission definition tokens for the user. The population of the hash map is described in FIG. 3B.

FIG. 2D shows an exemplary object in accordance with one or more embodiments of the technology. The object (210) corresponds to a combination of content (218) as well as content metadata (216) and permission metadata (214) associated with the content. Each of the portions of the object (210) is described below.

In one embodiment of the technology, the permission metadata (212) includes permission definition tokens (214) (i.e., the permission definition tokens corresponding to the permission definition with which the object (210) is associated), a permission definition ID (202) (i.e., the permission definition ID corresponding to the permission definition with which the object (210) is associated), and a permission definition fingerprint (i.e., the permission definition fingerprint corresponding to the permission definition with which the object (210) is associated).

The content metadata (220) metadata associated with the object. Examples of metadata may include, but are not limited to, author, content name, creation time, creation date, size of object, modification time, modification date, keywords (e.g., keywords extracted from the content), topics related to the content in the object, the object format (i.e., the format of the content (218), e.g., portable document format (PDF), MPEG-4, .txt, etc.). With respect to the content, the content may correspond to any type of data that may be stored in the content repository. Examples of content may include, but are not limited to, text files, audio files, image files, and/or audio-visual files.

In one embodiment of the technology, the metadata (212, 216) and content associated with a given object may be stored in a single location. Alternatively, the metadata (212, 216) associated with an object may be stored in a first location and the content associated with a given object may be stored in a second location, where the first and second locations may be in the same or different content repositories. Further, content metadata (216) and the permission metadata (212) for a given object may each be stored in a separate location, which may (or may not) be distinct from the location in which the content of the object is stored.

FIGS. 3A-6 show flowcharts in accordance with one or more embodiments of the technology. While the various steps in the flowcharts are presented and described sequentially, one of ordinary skill will appreciate that some or all of these steps may be executed in different orders, may be combined or omitted, and some or all of the steps may be executed in parallel.

Figure 3B:
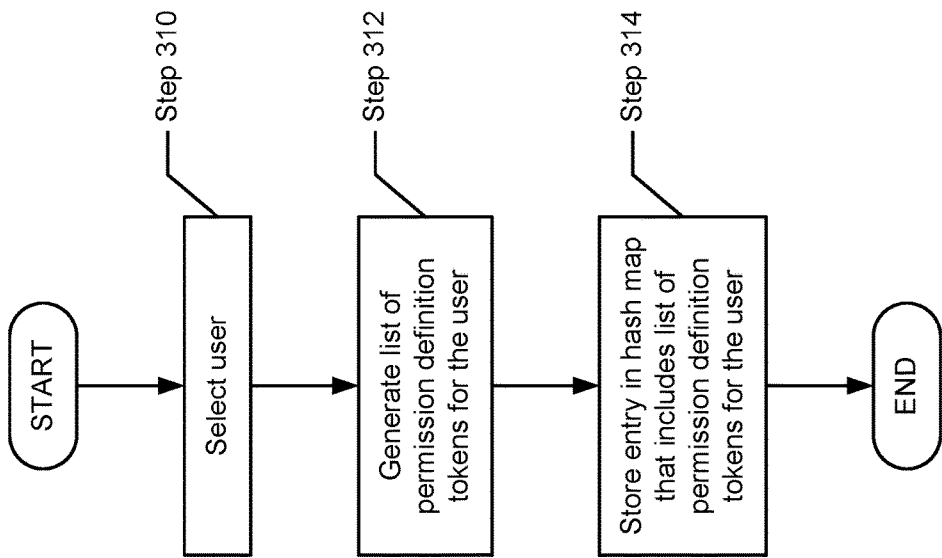
FIG. 3B shows a method for associating permission definition tokens with users in accordance with one or more embodiments of the technology.
Figure 3A:
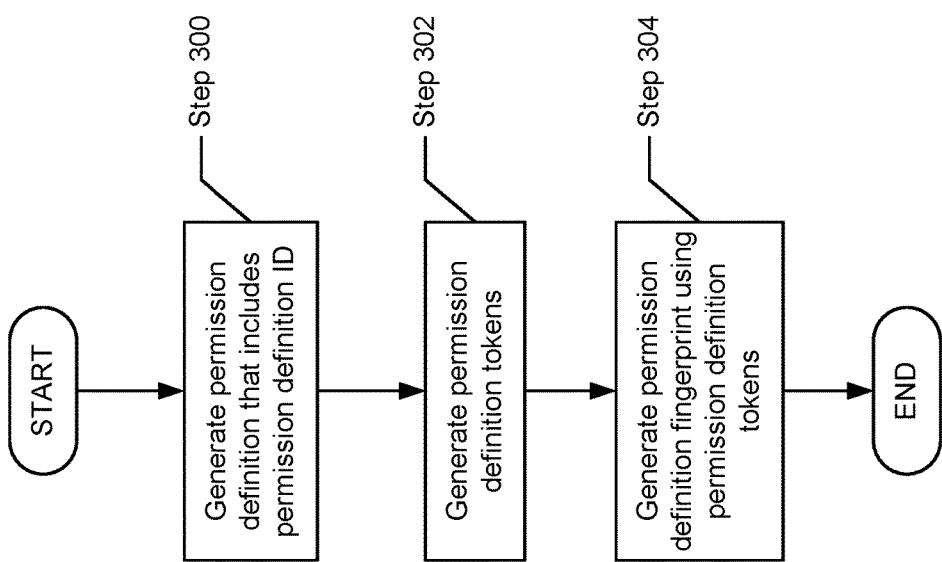
FIG. 3A shows a method for generating permission definition tokens in accordance with one or more embodiments of the technology.

FIG. 3A shows a method for generating permission definition tokens in accordance with one or more embodiments of the technology.

In step 300, a permission definition is generated. In one embodiment of the technology, the content management service may provide a user interface through which a user may specify information that is used to generate one or more permission definitions. In another embodiment of the technology a user, via a client system, may provide a permission definition to the content management service (e.g., via an Application Programming Interface (API) or another mechanism). The permission definition may be provided in any known format (e.g., eXtensible Markup Language) or any other later discovered format without departing from the technology. In one embodiment of the technology, the permission definition generated in step 300 is associated with a permission definition ID. The permission definition ID may be specified by a user and/or automatically generated by the content management service.

In step 302, the permission definition is parsed into one or more sub-permission definitions (as described above). The sub-permission definitions are then used to create a corresponding set of permission definition tokens.

In step 304, the permission definition tokens generated in step 302 are then used to generate a permission definition fingerprint.

Thought not shown in FIG. 3A, the permission ID, the permission definition, the permission definition tokens, and the permission definition fingerprint may be stored, as a permission record, in a content repository (see e.g., FIG. 1) and/or in another location that is accessible by the content management service.

FIG. 3B shows a method for associating permission definition tokens with users in accordance with one or more embodiments of the technology.

In step 310, a user is selected. The user may be selected using any known or later discovered method. The selected user corresponds to a user that may issue queries to the content management service using one or more client systems.

In step 312, a list of permission definition tokens for the user is generated. The list of permission definition tokens is generated by: (i) identifying all permission definitions that explicitly correspond to the user (i.e., the user (or an user ID of the user is specified in the permission definition), (ii) identifying all permission definitions that specify a group of which the user is a member, (iii) adding all permission definition tokens corresponding to the permission definitions identified in (i) to the list of permission definition tokens, and (iv) for each permission definition identified in (ii), determining which sub-permission definitions are associated with the user and then adding the corresponding permission token definitions to the list of permission definitions. In addition to the above, if there is a default permission token definition (i.e., a permission token definition corresponding to a permission definition that allows any user to access the object), then the default permission token is added to the list of permission token definitions.

The following is a non-limiting example of generating a list of permission token definitions for a user. Turning to the example, consider a scenario in which there content management service includes the following permission definitions: Permission Definition 1: [Group A: read, Group B: Read, Group C: read and write]; Permission Definition 2: [any user can read and write]; Permission Definition 3: [User: Bob can read]. Further, Bob is a member of Group A but is not a member of Group B or Group C. Based on the above, the list of permission tokens for user Bob includes: (i) a permission token corresponding to "[Group A:read]"; (ii) a permission token corresponding to "[any user can read]"; and (iii) a permission token corresponding to "[User: Bob can read]".

Continuing with the discussion of FIG. 3B, in step 314, a hash table entry is generated and stored in a hash map. The hash table entry may include (i) a hash value generated using a user ID corresponding to the user (i.e., the user selected in step 310), and (ii) the list of permission definition tokens generated in step 312).

Figure 4:
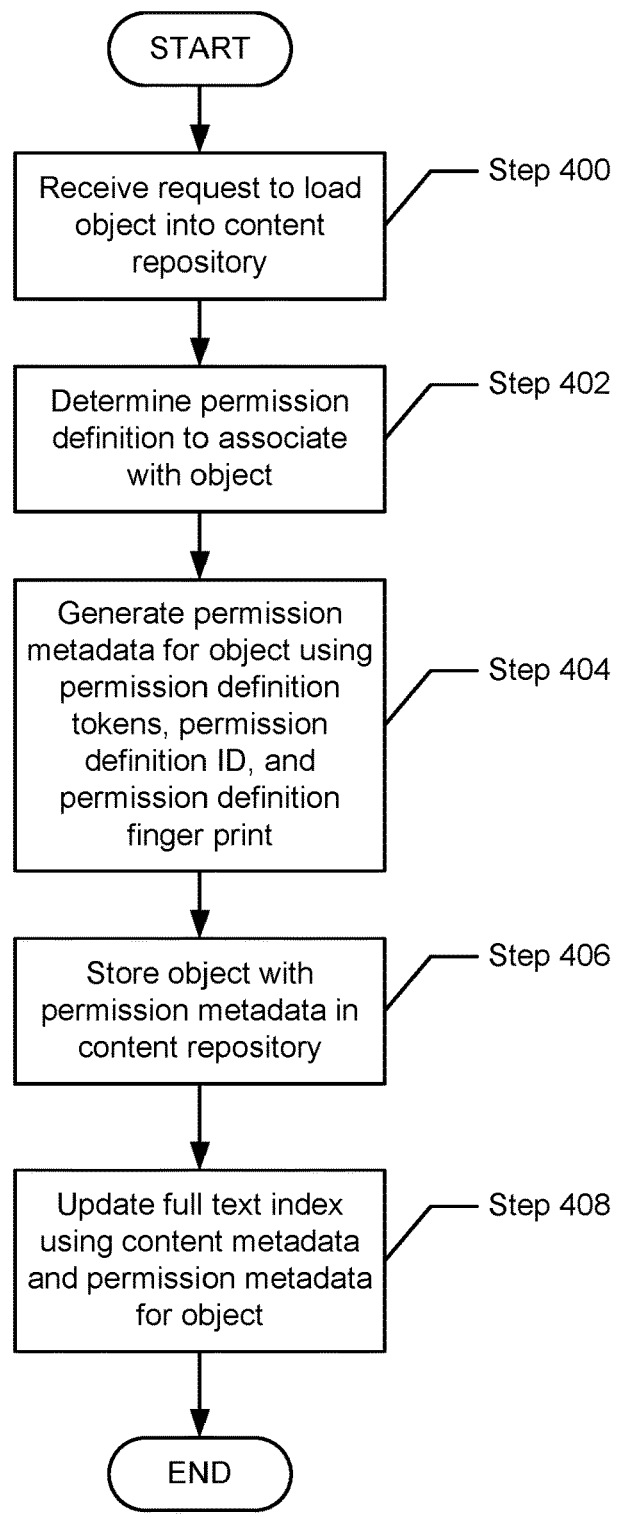
FIG. 4 shows a method for associating permission metadata with objects in accordance with one or more embodiments of the technology.

FIG. 4 shows a method for associating permission metadata with objects in accordance with one or more embodiments of the technology. More specifically, FIG. 4 shows a method for storing objects in a content repository in accordance with one or more embodiments of the technology. The method shown in FIG. 4 may be performed, for example, when a set of objects is initially being loaded into the content repository.

In step 400, a request to load an object is received. In step 402, the permission definition associated with the object is determined. In one embodiment of the technology, a permission definition ID is included in the request (i.e., the request in step 400). In such scenarios, step 402 is not performed. In another embodiment of the technology, the content management service may determine a permission definition to associate with the object. The content management service may use any known or later discovered method to determine an appropriate permission definition to associate with the object.

In step 404, permission metadata is generated for the object. Generating the permission metadata may include obtaining the following information from a content repository and/or from another storage location that is accessible to the content management service: (i) the permission definition tokens corresponding to the permission definition identified in step 402, (ii) the permission definition ID corresponding to the permission definition identified in step 402, and (iii) the permission definition fingerprint corresponding to the permission definition identified in step 402. At least a portion of the aforementioned information used to generate the permission metadata for the object may be obtained from a permission record (described above) corresponding to the permission definition identified in step 402.

In step 406, the object (including the content, content metadata and permission metadata) is stored in the content repository. As discussed above, the content, content metadata, and the permission metadata may be stored in the same and/or different locations within the content repository(ies).

In step 408, the full text index is updated using the content metadata, the content of the object, and the permission metadata for the object. More specifically, in one embodiment of the technology, the full text index is updated to include the permission definitions tokens that are associated with the object.

The following is a non-limiting example of how the full text index for a document may be created and updated using one or more embodiments of the invention. Turning to the example, consider a scenario in which an object is a document that includes the following content: Tom likes apples. Prior to adding the permission metadata, the full text index for the document may be represented as follows:

| Text | Index |
| --- | --- |
| Tom | 1 |
| Likes | 2 |
| Apples | 3 |

After adding the permission metadata, the full text index for the document has the following content:

| Text | Index |
| --- | --- |
| Tom | 1 |
| Likes | 2 |
| Apples | 3 |
| GRP1200000180000100 | 4 |
| GRP1200000180000103 | 5 |
| USR110000018000016B | 6 |

Figure 5:
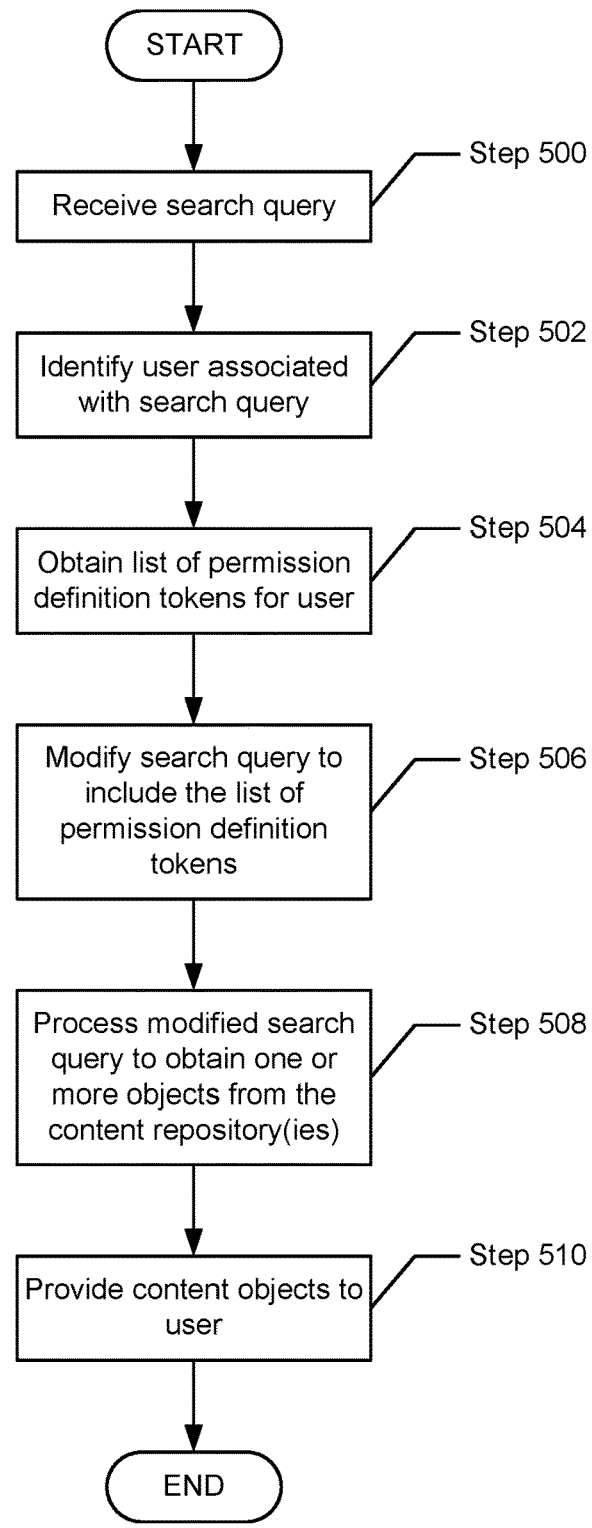
FIG. 5 shows a method for servicing queries in accordance with one or more embodiments of the technology.

FIG. 5 shows a method for servicing requests in accordance with one or more embodiments of the technology.

In step 500, a request is received by the content management service from a requesting entity (e.g., a client system). In one embodiment of the technology, the request includes a query as well as a user ID of the user that issued the request.

In step 502, the user associated with the query is identified. Step 502 may include extracting the user ID from the request. If the user ID is not included in the request, the content management service may use any other known or later discovered method for determining the user associated with the request.

In step 504, a list of permission definition tokens associated with the user is obtained. In one embodiment of the technology, the list of permission definitions is obtained using the hash map. More specifically, the user ID (obtained in step 500 and/or 502) is hashed to obtain a hash value. A look-up in the hash map is then performed using the hash value in order to obtain an entry in hash map. The list of permission token definitions is subsequently obtained from the entry.

In step 506, the query received in step 500 is modified to include the list of permission tokens obtained in step 504. The following is a non-limiting example of a modified query.

Consider a scenario in which the original query was: contains 'apple'. Further, assume that the following permission token definitions were identified in step 504: "GRPD-MWORLD, GRP1200000180000100, GRP1200000180000103, and USR110000018000016B. The resulting modified query is: "contains 'apple' and contains ('GRPDMWORLD' or 'GRP1200000180000100' or 'GRP1200000180000103' or 'USR110000018000016B')". Other methods of including the permission token definitions in the query may be implemented without departing from the technology.

In step 508, the request is serviced, where servicing the request includes processing the modified query in order to identify one or more objects (see e.g., FIG. 2D) stored in the content repository(ies). In embodiment of the technology because the permission definition tokens are part of the full text index, the permission definition tokens are treated like any other term in a search query. Accordingly, in one embodiment of the invention, the searching of the full text index (which includes the permissions definition tokens) enables enforcement of access permissions at the same time the the full text index is being searched. In this manner no additional access permission processing of the retrieved objects is required once the objects are retrieved. In step 510, the one or more objects identified in step 508 are provided to the user via the client system that issued the request (i.e., the request in step 500).

FIG. 6 shows a method for updating permission metadata for objects in accordance with one or more embodiments of the technology. FIG. 6 may be performed when a permission definition is modified. Modification of the permission definition may include generating one or more new permission definition tokens (which correspond to the modified permission definition) and generating a new permission definition fingerprint using the new permission definition tokens as well as any appropriate existing permission definition tokens. The method shown in FIG. 6 may be performed by a background process, which may or may not be executing on the content management service.

The following is a non-limiting example of modifying a permission definition. Consider a scenario in which the content management service includes the following permission definition: Permission Definition 1: [Group A: read, Group B: Read, Group C: read and write] that is associated with Permission Definition ID=PD1 and with three permission definition tokens: (i) permission definition token corresponding to "Group A: read", (ii) permission definition token corresponding to "Group B: read", and (iii) permission definition token corresponding to "Group C: read and write".

At some later point in time, Permission Definition 1 is updated to remove "Group A: read" and add "User Joe: read". In response to this update, the permission definition tokens associated with the updated permission definition are: (i) permission definition token corresponding to "Group B: read", (ii) permission definition token corresponding to "Group C: read and write"; and (iii) permission definition token corresponding to "User Joe: read". In this example, in response to the update, one new permission definition token is generated (i.e., the permission definition token corresponding to "User Joe: read") and one previously generated permission token definition is removed (i.e., permission definition token corresponding to "Group A: read"). A new permission definition fingerprint is subsequently generated for the updated permission definition using the following permission definition tokens: (i) permission definition token corresponding to "Group B: read", (ii) permission definition token corresponding to "Group C: read and write"; and (iii) permission definition token corresponding to "User Joe: read". The permission record for Permission Definition 1 is subsequently updated to include the new permission definition fingerprint, to include the permission definition token corresponding to "User Joe: read", and to remove permission definition token corresponding to "Group A: read. While other portions of the permission record may be updated for permission definition 1, the permission definition ID associated with permission definition remains the same.

Turning to FIG. 6, in step 600, a permission definition update is initiated. The permission definition update may be implemented each time there is a change to a permission definition (e.g., as described above).

In step 602, a query is generated and issued to the content repository(ies), where the query includes the permission definition ID corresponding to the permission definition that has been modified. The result of issuing the query is a set of objects that include, within their permission metadata, the permission definition ID. Each of the objects identified in step 602 is processed using steps 604-612.

In step 604, an object from the set of objects obtained in step 602 is selected.

In step 606, a determination is made about whether the permission definition fingerprint that is currently stored in the permission metadata associated with the selected object matches the permission definition fingerprint that is stored in the permission record associated with the permission definition ID (i.e., the permission definition ID used in the query in step 602). If the permission fingerprint definitions match the process proceeds to step 612; otherwise the process proceeds to step 608.

In step 608, the permissions metadata in the object is updated to include the permission definition tokens and the permission definition fingerprint stored in in the permission record associated with the permission definition ID (i.e., the permission definition ID used in the query in step 602). The updating in step 608 may include removing permission definitions that are no longer in-use as a result of the modification of the permission definition.

In step 610, the full text index is updated to include the new permission definition tokens (i.e., the new permission definition tokens associated with the modified permission definition) and to remove any permission token definitions that are no longer applicable to the object(s) (i.e., permission definition tokens corresponding to sub-permission definitions that were removed when the permission definition was modified).

In step 612, a determination is made about whether there are any other objects (from the set of objects identified in step 604) to process. If there are additional objects to process, the process proceeds to step 604; otherwise, the process ends.

Embodiments of the technology may be implemented on a computing system. Any combination of mobile, desktop, server, embedded, or other types of hardware may be used. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code, that when executed by a processor(s), is configured to perform embodiments of the technology.

Further, one or more elements of the aforementioned computing system (700) may be located at a remote location and connected to the other elements over a network (712). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for servicing requests, the method comprising:
   receiving a permission definition;
   generating at least a first permission token definition using the permission definition;
   updating a full text index with at least the first permission token definition to obtain an updated full text index;
   generating a permission definition fingerprint using at least the first permission token definition;
   storing the permission definition fingerprint and a permission definition ID associated with the permission definition in permission metadata associated with a first object;
   receiving, from a client system, a first request comprising a query;
   determining a first user associated with the first request;
   modifying the query to obtain a first modified query, wherein the first modified query comprises the first permission definition token associated with the first user;
   processing the modified query to obtain a first object from a content repository, wherein processing the first modified query to obtain the first object comprises using the updated full text index and wherein the updated full text index includes the permission metadata associated with the object; and
   providing the first object to the client system.

2. The method of claim 1, further comprising:
   receiving, from a second client system, a second request comprising the query;
   determining a second user associated with the second request;
   modifying the query to obtain a second modified query, wherein the second modified query comprises a second permission definition token associated with the second user;

processing the second modified query to obtain a second object; and
providing the second object to the second client system.

3. The method of claim 1, further comprising:
after to receiving the first request:
modifying the permission definition to obtain a modified permission definition;
generating at least a second permission token definition using the modified permission definition;
generating a second permission definition fingerprint using at least the second permission token definition; and
storing the second permission definition fingerprint in the permission metadata associated with the object.

4. The method of claim 1, wherein modifying the query to obtain the first modified query comprises:
generating a hash value using a user ID associated with the first user;
performing a look-up in a hash map using the hash value to obtain an entry, wherein the entry comprises the first permission token definition associated with the first user.

5. The method of claim 4, wherein the entry comprises a second permission token definition associated with the first user.

6. The method of claim 1, wherein the first permission token definition associated with the first user is a string and wherein the string comprises at least one selected from a group consisting of a number and a letter.

7. A non-transitory computer readable medium comprising computer readable program code, which when executed by a computer processor enables the computer processor to perform a method for servicing requests, the method comprising:
receiving a permission definition;
generating at least the first permission token definition using the permission definition;
updating a full text index with at least the first permission token definition to obtain an updated full text index;
generating a permission definition fingerprint using at least the first permission token definition;
storing the permission definition fingerprint and a permission definition ID associated with the permission definition in permission metadata associated with a first object;
receiving, from a client system, a first request comprising a query;
determining a first user associated with the first request;
modifying the query to obtain a first modified query, wherein the first modified query comprises a first permission definition token associated with the first user;
processing the modified query to obtain the first object from a content repository, wherein processing the first modified query to obtain the first object comprises using the updated full text index; and
providing the first object to the client system.

8. The non-transitory computer readable medium of claim 7, the method further comprising:
receiving, from a second client system, a second request comprising the query;
determining a second user associated with the second request;
modifying the query to obtain a second modified query, wherein the second modified query comprises a second permission definition token associated with the second user;
processing the second modified query to obtain a second object; and
providing the second object to the second client system.

9. The non-transitory computer readable medium of claim 7, the method further comprising:
after to receiving the first request:
modifying the permission definition to obtain a modified permission definition;
generating at least a second permission token definition using the modified permission definition;
generating a second permission definition fingerprint using at least the second permission token definition; and
storing the second permission definition fingerprint in the permission metadata associated with the object.

10. The non-transitory computer readable medium of claim 7, wherein modifying the query to obtain the first modified query comprises:
generating a hash value using a user ID associated with the first user;
performing a look-up in a hash map using the hash value to obtain an entry, wherein the entry comprises the first permission token definition associated with the first user.

11. The non-transitory computer readable medium of claim 10, wherein the entry comprises a second permission token definition associated with the first user.

12. The non-transitory computer readable medium of claim 7, wherein the first permission token definition associated with the first user is a string and wherein the string comprises at least one selected from a group consisting of a number and a letter.

13. A system, comprising:
a content repository storing objects;
a content management system coupled to the content repository and programmed to:
receiving a permission definition;
generating at least the first permission token definition using the permission definition;
updating a full text index with at least the first permission token definition to obtain an updated full text index,
generating a permission definition fingerprint using at least the first permission token definition;
storing the permission definition fingerprint and a permission definition ID associated with the permission definition in permission metadata associated with a first object:
receive, from a client system, a first request comprising a query;
determine a first user associated with the first request;
modify the query to obtain a first modified query, wherein the first modified query comprises a first permission definition token associated with the first user;
process the modified query to obtain the first object from a content repository, wherein processing the first modified query to obtain the first object comprises using the updated full text index; and
provide the first object to the client system.

14. The system of claim 13, wherein content management system is further programmed to:
receive, from a second client system, a second request comprising the query;
determine a second user associated with the second request;

modify the query to obtain a second modified query, wherein the second modified query comprises a second permission definition token associated with the second user;

process the second modified query to obtain a second object; and provide the second object to the second client system.

* * * * *